United States Patent [19]
Oakley

[11] Patent Number: 5,844,196
[45] Date of Patent: Dec. 1, 1998

[54] SYSTEM AND METHOD FOR DETECTING NOZZLE AND ELECTRODE WEAR

[75] Inventor: Thomas Franklin Oakley, Florence, S.C.

[73] Assignee: The ESAB Group, Inc., Florence, S.C.

[21] Appl. No.: 929,857

[22] Filed: Sep. 15, 1997

[51] Int. Cl.$^6$ ..................................... B23K 10/00
[52] U.S. Cl. ................................ 219/121.54; 219/121.5; 219/124.02; 219/121.44; 219/121.56
[58] Field of Search ........................ 219/121.51, 121.5, 219/121.39, 121.44, 74, 73, 121.54, 121.57, 124.02

[56] References Cited

U.S. PATENT DOCUMENTS

| | | |
|---|---|---|
| 4,156,125 | 5/1979 | Brown . |
| 5,124,525 | 6/1992 | Severance, Jr. et al. . |
| 5,160,821 | 11/1992 | Oakley . |
| 5,194,715 | 3/1993 | Severance, Jr. et al. . |
| 5,216,221 | 6/1993 | Carkhuff . |
| 5,326,955 | 7/1994 | Nishi et al. . |
| 5,446,255 | 8/1995 | Blondy et al. . |
| 5,521,350 | 5/1996 | Nishi et al. . |
| 5,717,187 | 2/1998 | Rogbzinski et al. ............... 219/121.54 |

FOREIGN PATENT DOCUMENTS

| | | |
|---|---|---|
| 405200556 A | 8/1993 | Japan . |
| 405245645 A | 9/1993 | Japan . |
| 405245646 A | 9/1993 | Japan . |
| 406304756 A | 11/1994 | Japan . |
| 1660894 A | 7/1991 | Russian Federation . |
| 1218576 A1 | 11/1993 | Russian Federation . |

*Primary Examiner*—Mark H. Paschall
*Attorney, Agent, or Firm*—Bell Seltzer Intellectual Property Law Group of Alston & Bird LLP

[57] ABSTRACT

A system and method for detecting nozzle and electrode wear of plasma arc torches in which the average change in the stand-off between the electrode or the nozzle assembly of the plasma arc torch and a workpiece is monitored, and corrective measures are taken once the average change in the stand-off of the electrode and nozzle assembly exceeds a predetermined value. The corrective measures may include changing the arc voltage of the plasma arc torch, modifying the speed at which the plasma arc torch travels, modifying the average current of the power supply of the plasma arc torch, or the flow rate of the plasma supply gases or cut water of the plasma arc torch. The number of corrections is monitored so that after a predetermined number of such corrections, the system and method notifies an operator or the plasma arc torch itself that the electrode or surrounding nozzle requires replacement.

20 Claims, 4 Drawing Sheets

SYSTEM AND METHOD FOR DETECTING NOZZLE AND ELECTRODE WEAR

FIELD OF THE INVENTION

The present invention relates to a system and method for automatically detecting nozzle and electrode wear of plasma arc torches.

BACKGROUND OF THE INVENTION

The use of plasma arc torches to cut metal workpieces to a desired shape is known in the art. For example, as described in U.S. Pat. No. 5,216,221 to Carkhuff, a plasma arc torch provides a high voltage to the electrode to create an electrical arc extending from the electrode and through the bore of a nozzle assembly. A flow of gas is generated between the electrode and the nozzle assembly to create a plasma flow through the bore to a workpiece positioned beneath the nozzle assembly.

The cutting of a workpiece requires the accurate location of the plasma arc torch, and specifically the electrode and nozzle of the plasma arc torch, during operation. An appropriate apparatus may be provided for accurately moving the torch or torches over the surface of the workpiece in a plane generally parallel thereto to enable the cutting of the workpiece to the desired shape.

During use, the high heat and electrical arc often damage the consumable components of the torch, such as the nozzle assembly and the electrode, and as a result, these components must be replaced periodically when consumed or damaged. Typically, these components are threaded prior to use onto the torch body by an operator. Once damaged or consumed, the operator unscrews the components from the torch body and replaces them. If the nozzle assembly or electrode is replaced before complete consumption, unnecessary waste occurs. On the other hand, if the nozzle assembly or electrode is not replaced until after complete consumption, the workpiece may be damaged as a result of using a consumed or worn out electrode or nozzle assembly, thereby causing unnecessary costs to be incurred.

Prior art systems and methods exist for determining use limits of electrodes. One such prior art system is U.S. Pat. No. 5,326,955 to Nishi et al. which discloses calculating the arc voltage based on various factors relating to the cutting conditions, including workpiece thickness, nozzle diameter and cutting speed, comparing the calculated voltage to a measured voltage reflective of the use limits of the electrode, and determining the difference between the calculated arc voltage and measured arc voltage.

Basing a determination of nozzle or electrode wear on factors such as a change in arc voltage may result in waste and inefficiency due to an inaccurate determination that the nozzle assembly or electrode requires changing, which in turn may cause unnecessary waste or additional costs. As a result, an improved system and method for detecting nozzle and electrode wear is needed.

SUMMARY OF THE INVENTION

It is, therefore, an object of the present invention to provide a system and method for efficiently detecting the wear of the nozzle or electrode of a plasma arc torch.

It is another object of the present invention to provide a system and method for detecting the wear of the nozzle or electrode of a plasma arc torch while avoiding unnecessary changing of the nozzle or the electrode, on the one hand, or damage to the workpiece on the other hand.

These and other objects are provided according to the present invention by a system and method for detecting the wear of at least one of an electrode and a surrounding nozzle of a plasma arc torch during the operation of the plasma arc torch. This system and method determines the distance between the electrode and the nozzle, and workpiece being cut by the plasma arc torch, during operation of the plasma arc torch. The system and method also determines changes in stand-off, i.e., the distance between the electrode or the nozzle assembly of the plasma arc torch and the workpiece to be cut, and based on the changes in stand-off, the system and method correspondingly indicate that the nozzle or electrode requires replacing. In addition, initial corrective measures may be implemented in response to the changes in stand-off in order to extend the life of the nozzle or electrode (i.e., to avoid replacing the electrode or nozzle unnecessarily).

The system and method according to the present invention continuously monitors the stand-off of the plasma arc torch during the operation of the plasma arc torch and thereby determines the average change in such distance, and compares the average change in such distance to a first predetermined value. The changes in the stand-off may be recorded. The present invention also indicates that at least one of the electrode and the surrounding nozzle requires changing in response to the comparison between the average change in stand-off and a first predetermined value. In other words, if the average change in the distance between at least one of the electrode and the surrounding nozzle, and the workpiece, exceeds the first predetermined value, the present invention indicates that either the electrode or the surrounding nozzle requires changing. In response to the indication, the electrode or the surrounding nozzle is replaced.

Further, the present invention also can avoid unnecessarily replacing electrodes or nozzles by implementing corrective measures to the operation of the plasma arc torch in response to the comparison between the average change in the stand-off and the first predetermined value. In other words, the invention provides for the correction of the operation of the plasma arc torch if the average change in the distance between at least one of the electrode and the surrounding nozzle, and the workpiece, is greater than the first predetermined value. Such corrective measures may extend the life of the nozzle or electrode by avoiding the replacement of the electrode or nozzle unnecessarily.

The system and method according to the present invention may determine the number of corrective measures implemented, compare the number of the corrections to a second predetermined value, and indicate when at least one of the electrode and the surrounding nozzle requires changing in response to the comparing step, i.e., if the number of corrections exceeds the second predetermined value. The corrective measures performed by the plasma arc torch may include modifying the arc reference set point of the plasma arc torch, the speed at which the plasma arc torch travels, the average current of the power supply of the plasma arc torch, or the flow rate of the plasma supply gases or cut water of the plasma arc torch.

The system and method for detecting the wear of at least one of an electrode in the surrounding nozzle also records the changes in the distance identified above, and as described above indicates that at least one of the electrode and the surrounding nozzle requires changing in response to the second predetermined value comparing means described previously.

BRIEF DESCRIPTION OF THE DRAWINGS

While some of the objects and advantages of this invention have been set forth above, other objects and advantages will appear as the description proceeds in conjunction with the drawings in which.

DETAILED DESCRIPTION OF THE ILLUSTRATED EMBODIMENTS

The present invention will now be described more fully hereinafter with reference to the accompanying drawings, in which a preferred embodiment of the present invention is shown. This invention may, however, be embodied in many different forms and should not be construed as limited to the embodiments set forth herein; rather, this embodiment is provided so that this disclosure will be thorough and complete, and will fully convey the scope of the invention to those skilled in the art. Like numbers refer to like elements throughout.

Figure 1:
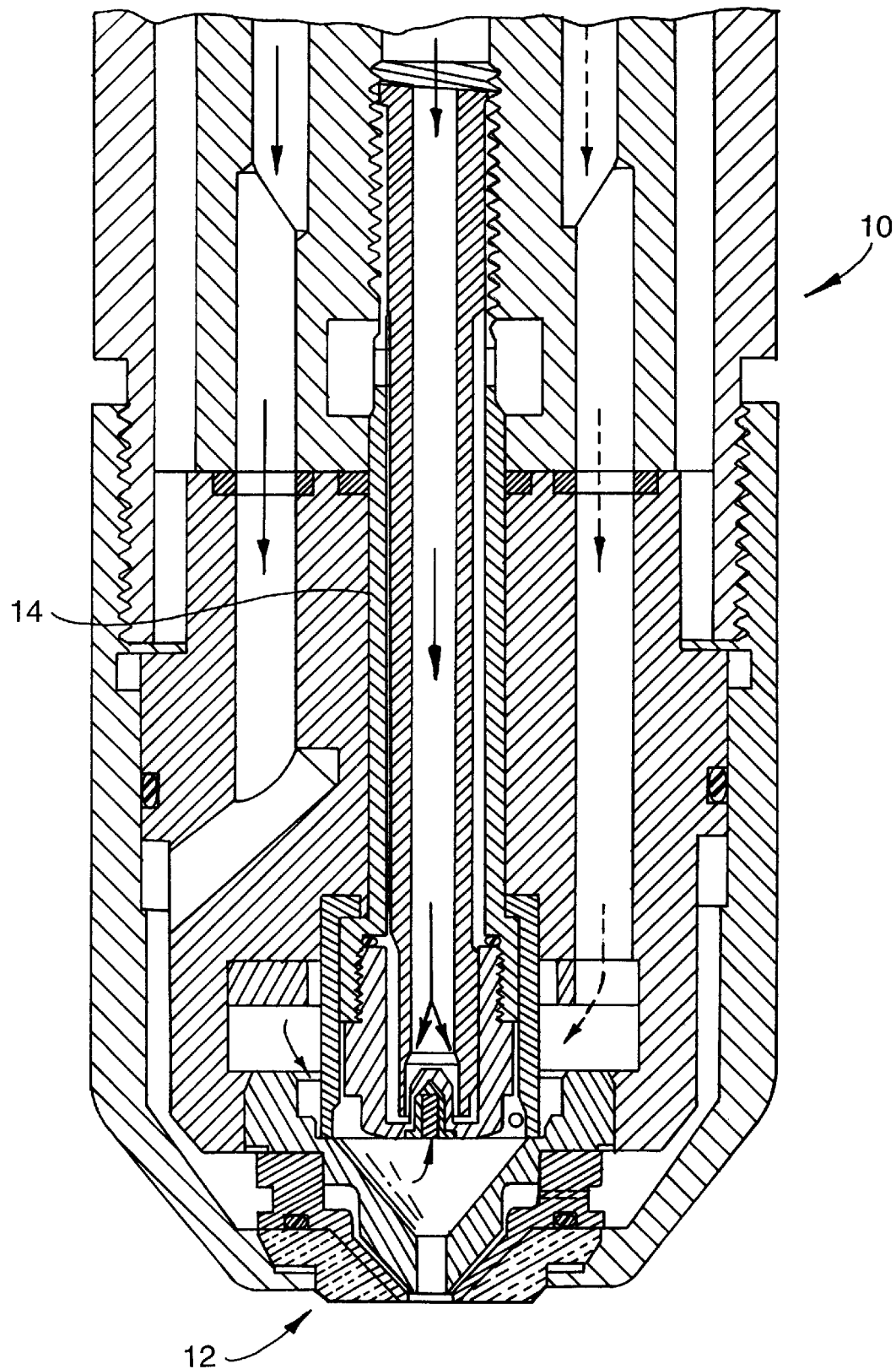
FIG. 1 is a sectional view of a plasma arc torch in accordance with the present invention.

Referring now to FIG. 1, a plasma arc torch 10 is illustrated. The plasma arc torch 10 includes a nozzle assembly 12 and a tubular electrode 14 defining a longitudinal axis.

There are a number of different plasma arc torches embodying the above-referenced elements to which the present invention is applicable. Since these torches are conventional and well-known, such torches will not be described herein. Similarly, there are a number of different types of power supplies for plasma arc torches which are well known and conventional and therefore also will not be described herein. Finally, a number of different types of mechanisms for mounting and moving plasma arc torches relative to workpieces also are well-known and need not be described herein. One example of a plasma arc cutting system is disclosed in U.S. Pat. No. 5,290,995, the disclosure of which is incorporated herein by reference.

Figure 2:
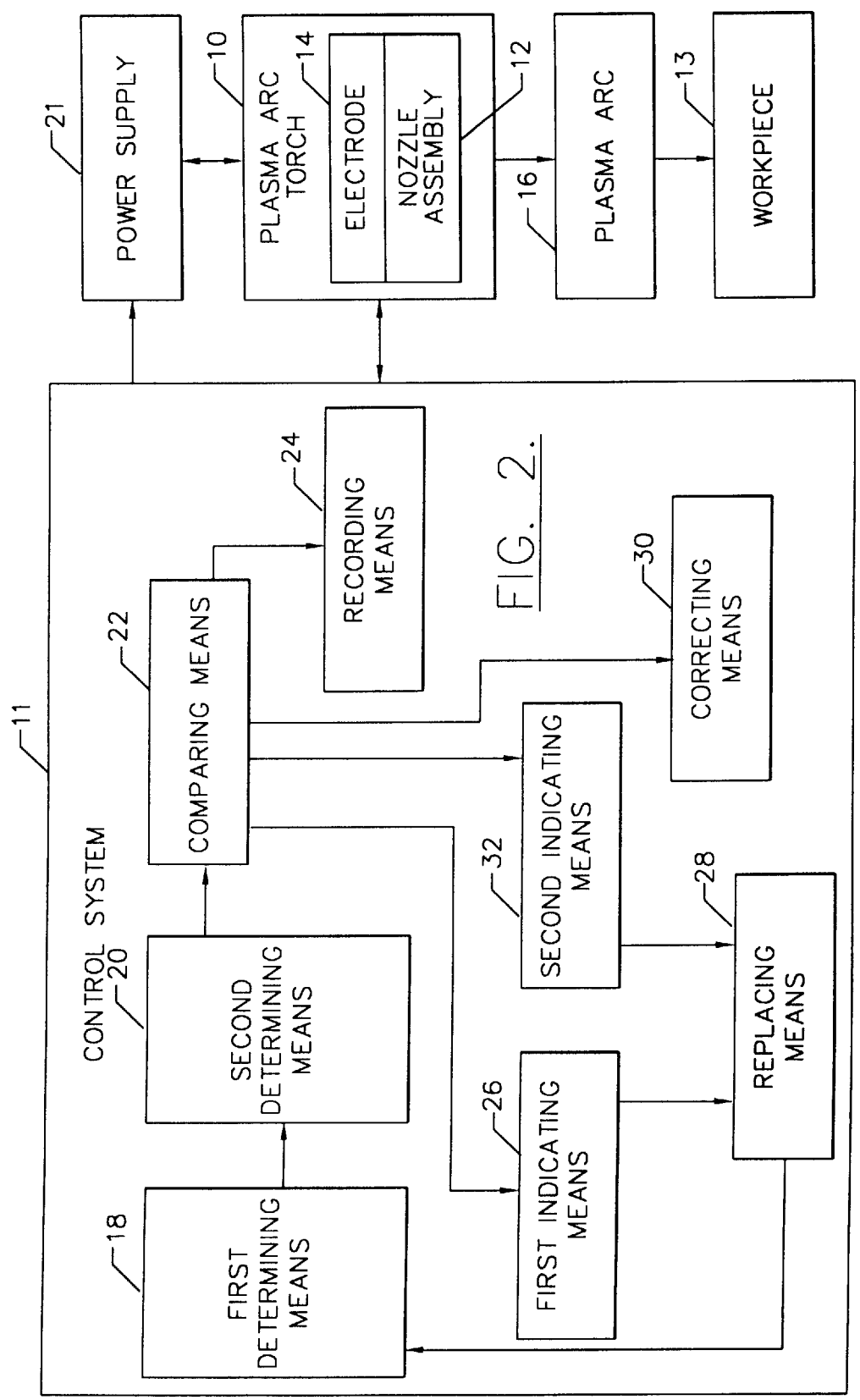
FIG. 2 is a block diagram according to the present invention illustrating the present invention for efficiently detecting wear of at least one of an electrode and a surrounding nozzle of a plasma arc torch.

As is shown in FIG. 2, the plasma arc torch 10 of the present invention comprises a control system 11, which may be implemented using a controller or microprocessor, the control system controlling the movement of a torch 10 relative to a workpiece 13. The control system 11 also controls the supply of power to the plasma arc torch 10 from a power supply 21. When power is supplied, a plasma arc 16 is established between the torch 10 and the workpiece 13 to cut or mark the workpiece 13.

In accordance with the present invention, a first determining means 18, which may be implemented using a transducer, is employed to determine the distance, i.e., the stand-off, between at least one of the electrode 14 and the surrounding nozzle assembly 12, and a workpiece 13, being cut by the plasma arc torch 10, during operation thereof. A second determining means 20 is employed for determining the average change in the distance, as determined by the first determining means 18, between either the electrode 14 and the workpiece 13 or the surrounding nozzle 12 and the workpiece 13, during operation of the plasma arc torch 10. Comparing means 22 is included for comparing the average change in the stand-off as determined by the second determining means 20 to a first predetermined value.

The present invention also comprises recording means 24 for recording changes in the distance between the electrode 14 and the workpiece 13 or the surrounding nozzle 12 and the workpiece 13, during operation of the plasma arc torch 10. First indicating means 26 is included for indicating that either the electrode 14 or the surrounding nozzle 12 requires changing in response to the comparing means 22. The first indicating means 26 is activated when the average change in the distance between either the electrode 14 and workpiece 13 or the surrounding nozzle 12 and workpiece 13, as determined by the second determining means 20, either exceeds a first predetermined value or is outside a predetermined window.

The present invention also comprises replacing means 28 for controlling the replacement of either the electrode 14 or the surrounding nozzle 12 in response to the indicating means 26. The present invention may also comprise correcting means 30 for implementing corrections to the operation of the plasma arc torch 10 in response to the comparing means 22 if the average change in the distance between either the electrode 14 and the workpiece 13 or the surrounding nozzle 12 and the workpiece 13 exceeds a predetermined value or is outside a predetermined window. Corrections that may be made include modification of the arc voltage, the speed at which the plasma arc torch travels, the average current of the power supply of the plasma arc torch, or the flow rate of the plasma supply gases or cut water of the plasma arc torch.

The present invention also comprises second indicating means 32 which indicates when the number of corrections exceeds a second predetermined value. In response to the second indicating means 32, the replacing means 28 is provided for controlling the replacement of either the electrode 14 or the surrounding nozzle 12.

Figure 3A:
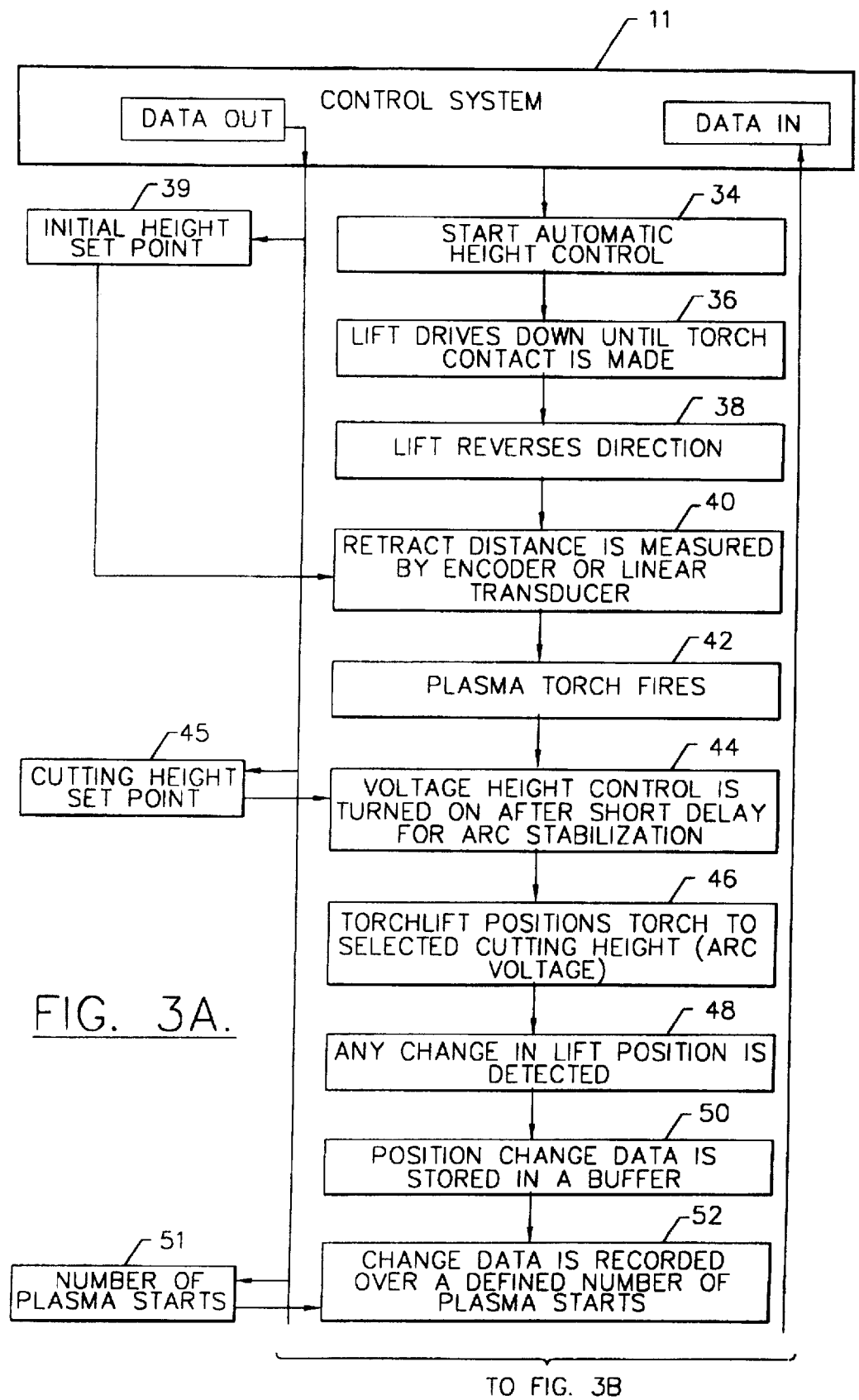
FIGS. 3A–3B are flow chart representations illustrating the operations according to the present invention for efficiently detecting wear of at least one of an electrode and surrounding nozzle of a plasma arc torch.
Figure 3B:
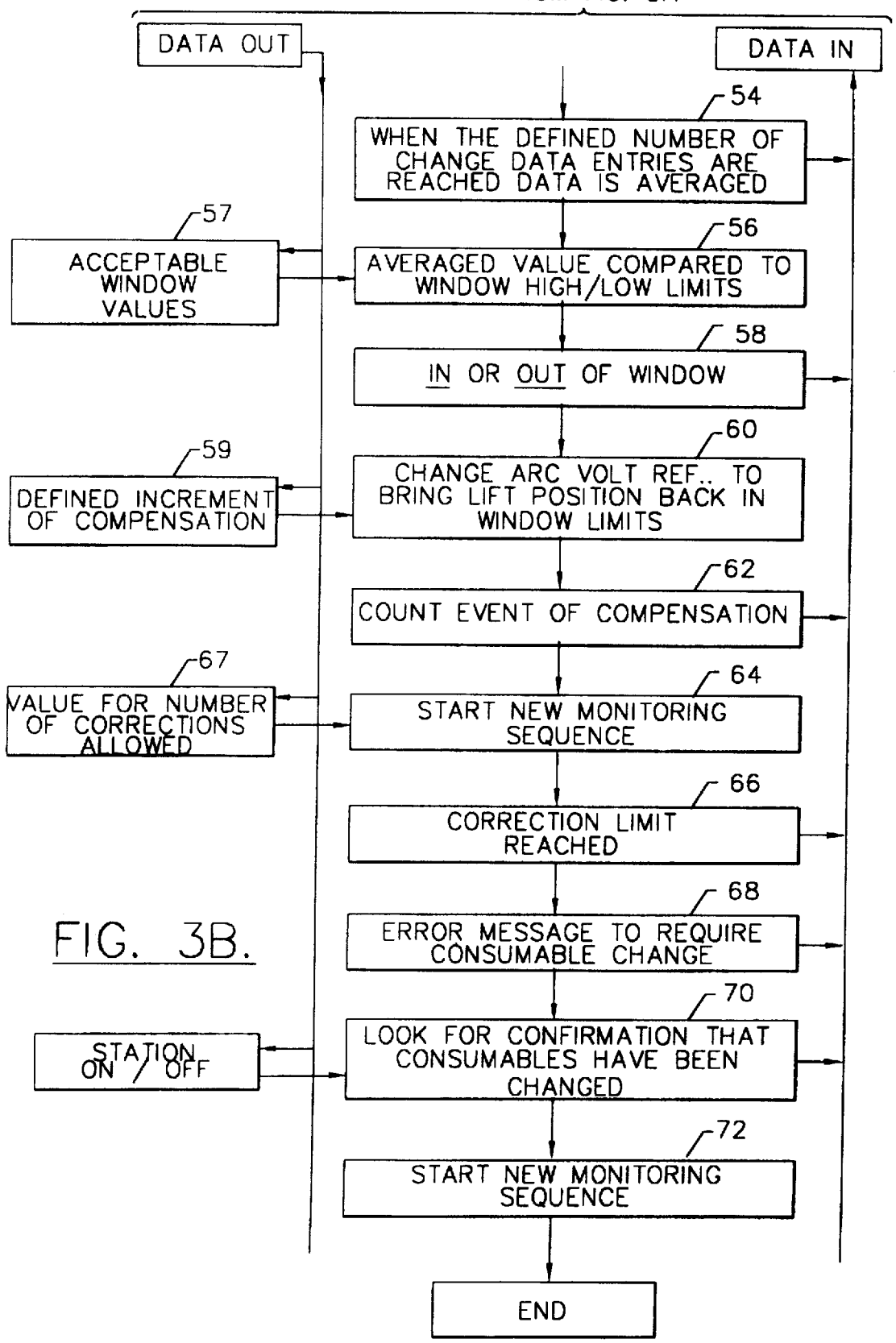

Referring now to FIG. 3, there is illustrated a flow chart representation illustrating the operations according to the present invention for detecting wear of at least one of an electrode and surrounding nozzle of a plasma arc torch. As described previously, the control system 11 of the present invention, which may be implemented using a controller or microprocessor, controls the movement of a torch 10 relative to a workpiece 13. To do so, the control system 11 starts automatic height control at 34 and proceeds to drive the lift down at 36 until torch contact is made with the workpiece. The lift then reverses direction at 38, to retract the torch to the initial height set point which was stored at 39 in the control system 11. The distance which the torch is retracted is measured by an encoder or linear transducer at 40.

The plasma torch is fired at 42 and, after a short delay to allow the arc voltage to stabilize, voltage height control is turned on at 44. The torch lift positions the torch to a selected cutting height at 46, the selected cutting height having been stored in the control system 11 at 45, and corresponding to the arc voltage of the plasma arc torch. Thereafter, any change in the lift position is detected at 48 by the control system 11 and recorded in memory (See FIG. 2). In response to the change in the lift position identified at 48 and recorded in memory, the change in torch height is stored in a buffer at 50. This process of identifying and recording changes in the lift position continues for a specific number of starts of the plasma arc torch as indicated at 52. The specific number of starts for which changes will be recorded is predetermined as indicated at 51.

When the predetermined number of starts of the plasma arc torch is reached, the change in torch height data is averaged at 54. The average is then compared to acceptable values within a window at 56. The acceptable values within a window are predetermined as indicated at 57. Based on this comparison, the system then determines whether the average is in or out of the window of predetermined, acceptable values at 58. If the average is not within the window of predetermined, acceptable values, the arc voltage is changed to bring the lift position of the plasma arc torch back within the limits of the acceptable window at 60. The amount that the arc voltage is changed is a predetermined increment of compensation, as indicated at 59. Each change of the arc voltage is counted at 62 and recorded. Other changes, including modifying the speed at which the plasma arc torch travels, modifying the average current of the power supply of the plasma arc torch, or changing the flow rate of the plasma supply gases or cut water of the plasma arc torch, may be made to bring the lift position back within the limits of the acceptable window.

After modifications have been made to bring the lift position of the plasma arc torch back within the acceptable limits, a new monitoring sequence begins at 64. Once the lift position of the plasma arc torch has been adjusted a defined number of times, a correction limit is reached at 66. The defined number of allowable corrections to the arc voltage is a predetermined number, as indicated at 67. After the predetermined number of corrections allowed is reached, as indicated at 66, an error message is provided to the operator of the plasma arc torch, as shown at 68, indicating that a change of either the electrode 14 or the surrounding nozzle 12 is required. The system will then look for confirmation that either the electrode 14 or the surrounding nozzle 12 has been changed, as indicated at 70. Once such confirmation has been made, a new monitoring sequence begins at 72, and the above-described process is completed.

Many modifications and other embodiments of the invention will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of detecting wear during operation of a plasma arc torch, of at least one of an electrode and a surrounding nozzle of the plasma arc torch, said method comprising the steps of:

determining the distance between said at least one of the electrode and the surrounding nozzle, and a workpiece being cut by the plasma arc torch, during operation of the plasma arc torch;

determining the average change in said distance between said at least one of the electrode and the surrounding nozzle, and said workpiece, during operation of the plasma arc torch; and comparing said average change in said distance between said at least one of an electrode and the surrounding nozzle, and said workpiece, to a first predetermined value.

2. A method of detecting wear as defined in claim 1, further comprising the step of storing in recording means said distance between said at least one of the electrode and the surrounding nozzle, and said workpiece, during operation of the plasma arc torch.

3. A method of detecting wear as defined in claim 1, further comprising the step of indicating at least one of the electrode and the surrounding nozzle requires changing in response to said comparing step if average change in said distance between said at least one of the electrode and the surrounding nozzle, and said workpiece, exceeds said first predetermined value.

4. A method of detecting wear as defined in claim 3, wherein said indicating step is followed by the step of replacing said at least one of the electrode and the surrounding nozzle in response to said indicating step.

5. A method of detecting wear as defined in claim 1, further comprising the step of correcting the operation of the plasma arc torch in response to said comparing step if said average change in said distance between said at least one of the electrode and surrounding nozzle, and said workpiece, is greater than said first predetermined value.

6. A method of detecting wear as defined in claim 5, further comprising the steps of:

determining the number of corrections made by said correcting step;

comparing the number of said corrections to a second predetermined value; and indicating said at least one of the electrode and the surrounding nozzle requires changing in response to said comparing second predetermined value step if said number of said corrections exceeds said second predetermined value.

7. A method of detecting wear as defined in claim 6, further comprising the step of replacing said at least one of the electrode and the surrounding nozzle in response to said second predetermined value indicating step.

8. A method of detecting wear as defined in claim 5, wherein said correcting step includes at least one of the steps of modifying the arc reference set point of the plasma arc torch, modifying the speed at which said plasma arc torch travels, modifying the average current of the power supply of said plasma arc torch, modifying the flow rate of the plasma supply gases or cut water of said plasma arc torch.

9. A method of detecting wear as defined in claim 7 wherein the number of said corrections is set to zero after said at least one of the electrode and the surrounding nozzle is replaced.

10. A system for detecting wear during operation of a plasma arc torch, of at least one of an electrode and a surrounding nozzle of the plasma arc torch, said system comprising:

first determining means for determining the distance between said at least one of the electrode and the surrounding nozzle, and a workpiece being cut by the plasma arc torch, during operation of the plasma arc torch;

second determining means for determining the average change in said distance between said at least one of the electrode and the surrounding nozzle, and said workpiece, during operation of the plasma arc torch; and comparing means for comparing said average change in said distance between said at least one of the electrode and the surrounding nozzle, and said workpiece, to a first predetermined value.

11. A system for detecting wear as defined in claim 10, further comprising recording means for recording changes in said distance between said at least one of the electrode and the surrounding nozzle, and said workpiece, during operation of the plasma arc torch.

12. A system for detecting wear as defined in claim 10, further comprising indicating means for indicating at least one of the electrode and the surrounding nozzle requires changing in response to said comparing means.

13. A system for detecting wear as defined in claim 12, wherein said indicating means is activated when said average change in said distance between said at least one of the electrode and the surrounding nozzle exceeds said first predetermined value.

14. A system for detecting wear as defined in claim 12, further comprising replacing means for controlling the replacement of said at least one of the electrode and the surrounding nozzle in response to said indicating means.

15. A system for detecting wear as defined in claim 10, further comprising correcting means for correcting the operation of the plasma arc torch in response to said comparing means if said average change in said distance between said at least one of the electrode and surrounding nozzle, and said workpiece, exceeds said first predetermined value.

16. A system for detecting wear as defined in claim 15, further comprising:

comparing means for comparing the number of said corrections made by said correcting means to a second predetermined value; and second indicating means for indicating said at least one of the electrode and the surrounding nozzle requires changing in response to said second predetermined value comparing means if said average change in said distance between said at least one of the electrode and surrounding nozzle, and said workpiece, exceeds said second predetermined values.

17. A system for detecting wear as defined in claim 16, further comprising replacing means for controlling the replacement of said at least one of the electrode and the surrounding nozzle in response to said second indicating means.

18. A system for detecting wear as defined in claim 15, wherein said correcting means includes at least one of means for modifying the arc reference set point of the plasma arc torch, modifying the speed at which said plasma arc torch travels, modifying the average current of the power supply of said plasma arc torch, modifying the flow rate of the plasma supply gases or cut water of said plasma arc torch.

19. A system for detecting wear as defined in claim 17 wherein said number of corrections made by said correcting means is set to zero after said at least one of the electrode and the surrounding nozzle is replaced in response to said second indicating means.

20. A system for detecting wear as defined in claim 10 wherein said first determining means comprises a transducer.

* * * * *